(12) United States Patent
Huggins et al.

(10) Patent No.: US 6,398,226 B1
(45) Date of Patent: Jun. 4, 2002

(54) CHUCK WITH ONE-WAY LOCK

(75) Inventors: Mark S. Huggins, Clemson; Gary L. Young, Six Mile, both of SC (US)

(73) Assignee: Power Tool Holders Incorporated, Christiana, DE (US)

( * ) Notice: Subject to any disclaimer, the term of this patent is extended or adjusted under 35 U.S.C. 154(b) by 61 days.

(21) Appl. No.: 09/631,009

(22) Filed: Aug. 2, 2000

(51) Int. Cl.[7] .......................... B23B 31/12; F16D 63/00
(52) U.S. Cl. ........................ 279/61; 188/82.84; 192/79; 192/93 C; 279/140; 279/902
(58) Field of Search .............................. 279/60–65, 140, 279/902; 188/82.1, 82.8, 82.84; 192/79, 93 C (56) References Cited

U.S. PATENT DOCUMENTS

| | | | | |
|---|---|---|---|---|
| 813,864 A | * | 2/1906 | Coit | 279/61 |
| 1,764,290 A | * | 6/1930 | Emrick | 279/60 |
| 2,550,871 A | * | 5/1951 | Sharp | 279/60 |
| 2,893,743 A | | 7/1959 | Ondeck | |
| 2,910,302 A | | 10/1959 | Ondeck | |
| 2,931,660 A | | 4/1960 | Barwinkel | |
| 3,894,743 A | * | 7/1975 | Hiroumi | 279/140 |
| 5,411,275 A | | 5/1995 | Huff et al. | |
| 5,431,419 A | * | 7/1995 | Mack | 279/140 |
| 5,503,409 A | | 4/1996 | Rohm | |
| 5,741,016 A | * | 4/1998 | Barton et al. | 279/140 |
| 5,816,582 A | * | 10/1998 | Steadings et al. | 279/140 |
| 5,944,327 A | | 8/1999 | Kanaan | |
| 5,984,320 A | * | 11/1999 | Nakamura | 279/140 |

* cited by examiner

*Primary Examiner*—Steven C. Bishop
(74) *Attorney, Agent, or Firm*—Nelson Mullins Riley & Scarborough, LLP (57) ABSTRACT

A chuck includes a generally elongated body having a tail section configured to rotate with the drive shaft and a nose section having an axial bore formed therein. A plurality of jaws are movably disposed with respect to the body to and away from the axial bore. A collar in axially driving engagement with the jaws is axially movably disposed with respect to the body so that movement in a first axial direction drives the jaws toward the axis and movement in the opposite direction moves the jaws away from the axis. The collar is configured to receive at least one of the body and a shaft and defines a first surface that faces a second surface defined by the body or the shaft when the same is received by the collar. The first surface is tapered in the axial direction from a first end to a second end of the fist surface so that a first radial distance between the second surface and the first end is less than a second radial distance between the second surface and the second end. A rolling element is disposed between the first and second surfaces and defines a diameter greater than the first radial distance and less than the second radial distance. When an axial force is applied to the collar in the second axial direction, the rolling element wedges between the first and second surfaces.

51 Claims, 5 Drawing Sheets

CHUCK WITH ONE-WAY LOCK

BACKGROUND OF THE INVENTION

The present invention relates generally to chucks for use with drills or electric or pneumatic power drivers. More particularly, the present invention relates to a chuck of the keyless type which may be tightened or loosened by hand.

Both hand and electric or pneumatic tool drivers are well known. Although twist drills are the most common tools used with such drivers, the tools may also comprise screw drivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to a driver by a threaded or tapered bore and may be formed integrally with the drive shaft of the drill.

A wide variety of chucks have been developed in the art. In one form of chuck, three jaws spaced circumferentially approximately 120 degrees apart from each other are constrained by angularly disposed passageways in a body attached to the drive shaft. The chuck is configured so that rotation of the body in one direction with respect to a constrained nut forces the jaws into or away from a gripping relationship with a tool shank. Such a chuck may be keyless if it can be tightened or loosened by manual rotation. Examples of such chucks are disclosed in U.S. Pat. Nos. 5,125,673 and 5,193,824, commonly assigned to the present assignee and the entire disclosures of which are incorporated by reference herein.

In another form of chuck, a nut is axially movably disposed about the chuck body so that axial movement of the nut with respect to the chuck body moves the chuck jaws within their passageways. The nut defines threads on an outer circumferential surface that mate with threads defined on an inner circumferential surface of a sleeve. Rotation of the sleeve with respect to the chuck body moves the nut axially to drive the jaws within the passageways to grip and ungrip a tool. Various configurations of keyless chucks are known in the art and are desirable for a variety of applications.

SUMMARY OF THE INVENTION

The present invention recognizes and addresses the foregoing considerations, and others, of prior art construction and methods. Accordingly, it is an object of the present invention to provide an improved chuck for use with a manual or powered driver.

This and other objects are achieved by a chuck for use with a manual or powered driver having a rotatable drive shaft. The chuck includes a generally elongated body having a nose section and a tail section. The tail section is configured to rotate with the drive shaft, and the nose section has an axial bore formed therein. A plurality of jaws are movably disposed with respect to the body to and away from the axial bore. A collar is in axially driving engagement with the jaws and is axially movably disposed with respect to the body so that movement of the collar in a first axial direction drives the jaws toward the axis of the bore and movement of the collar in a second axial direction opposite the first axial direction moves the jaws away from the axis. The collar is configured to receive at least one of the body and a shaft and defines a first surface that faces a second surface defined by at least one of the body and the shaft when at least one of the body and the shaft receives the collar. A collar first surface is tapered in the axial direction with respect to the axis from a first end of the first surface to a second end of the first surface so that a first radial distance between the second surface and the first end is less than a second radial distance between the second surface and the second end. At least one rolling element is disposed between the tapered first surface and the second surface when at least one of the body and the shaft is received by the collar, and defines a diameter greater than the first radial distance and less than the second radial distance so that when the rolling element engages at least one of the body and the shaft, the collar is movable in the first axial direction and so that axial force applied to the collar in the second axial direction wedges the rolling element between the tapered first surface and the second surface.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
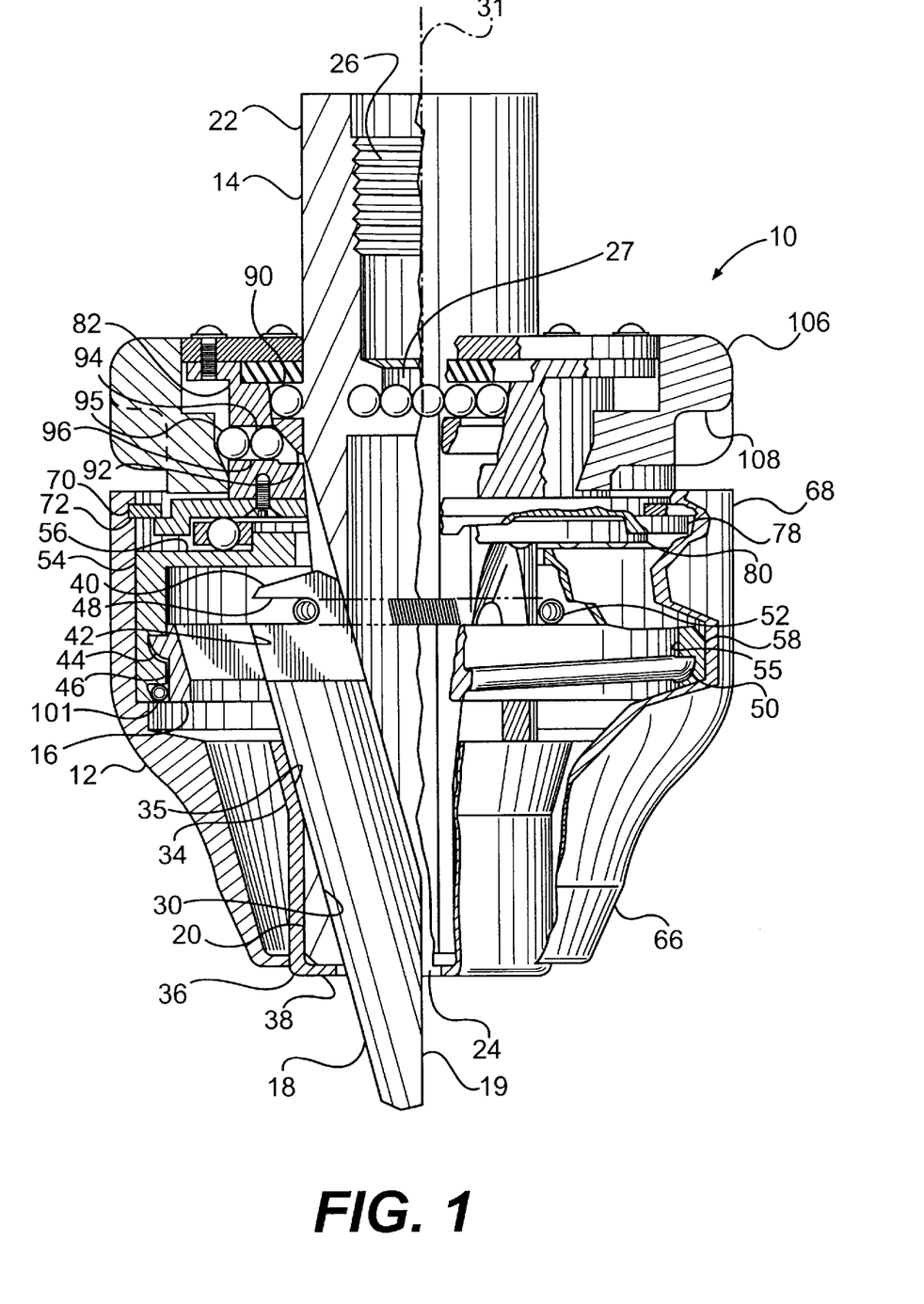
FIG. 1 is a plan view, partly in section, of a chuck constructed in accordance with an embodiment of the present invention.

Referring to FIG. 1, a chuck 10 includes a sleeve 12, a body 14, a nut 16, and jaws 18. Elongated body 14 is generally cylindrical in shape and includes a nose or forward section 20 and a tail or rearward section 22. An axial bore 24 is formed in nose section 20 and is somewhat larger than the largest tool shank that the chuck is designed to accommodate. A threaded bore 26 is formed in tail section 22 and is of a standard size to mate with and rotate with the drive shaft of a powered or hand driver (not shown). The bores 24 and 26 may communicate at a central region 27 of body 14. While a threaded bore 26 is described and illustrated, such bore may be replaced with a tapered bore of standard size to mate with a tapered drive shaft. Furthermore, the body may be formed integrally with the drive shaft.

A plurality of passageways 30 are formed in body 14 to accommodate each jaw 18. Preferably, three jaws 18 are employed, and each jaw is separated from the adjacent jaw by an arc of approximately 120 degrees. The axes of passageways 30 and jaws 18 are angled with respect to the chuck axis 31 but intersect the axis at a common point ahead of chuck body 14. Each jaw 18 defines a tool engaging surface 19 proximate an axially forward end of the jaw. Tool engaging surface 19 is generally parallel to the axis of axial bore 24, which is axis 31 of body 14. Each jaw 18 also defines an end section 40 at an axially rearward end of the jaw that extends through a respective slot 42 in nut 16. Each end section 40 has a generally rectangular cross-section that corresponds to the cross-section of its slot 42 so that the slot slideably receives the jaw end section and prevents rotation of the jaw about the jaw's axis within its respective passageway 30.

Nut 16 includes a male thread 44 extending about an outer circumferential surface 46. Thread 44 has the same pitch as a female thread 50 defined on an inner circumferential surface 55 of sleeve 12, so that relative rotation between nut 16 and sleeve 12 moves the nut axially with respective to the sleeve. In one preferred embodiment, the nut defines an eight pitch thread. As illustrated, nut thread 44 defines a generally quarter-circular arc from its axially forward edge to a generally perpendicular rear surface extending from surface 46 to the thread's outer diameter. However, any suitable thread arrangement could be used.

Figure 3:
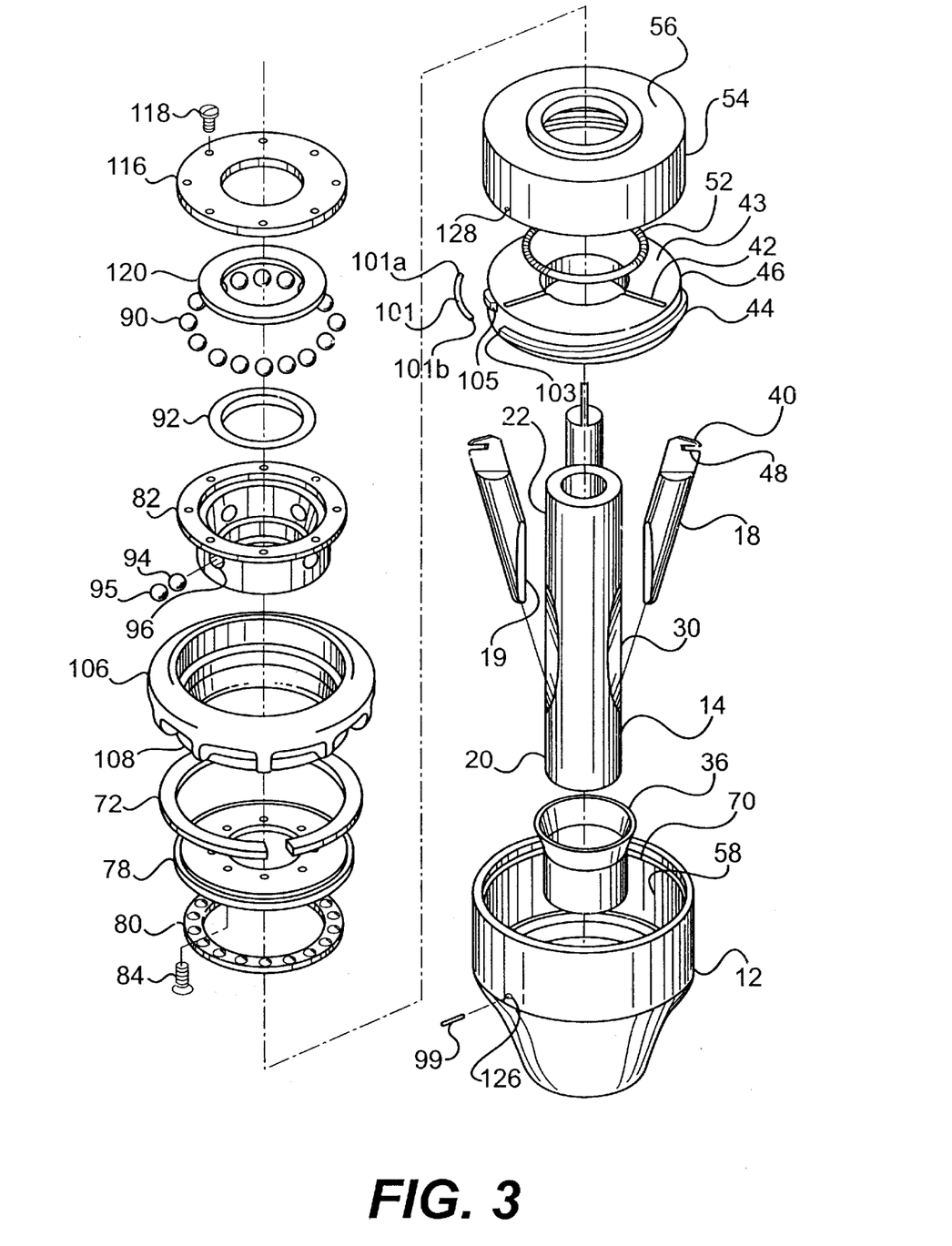
FIG. 3 is an exploded view of the chuck as shown in FIGS. 1 and 2.
Figure 4:
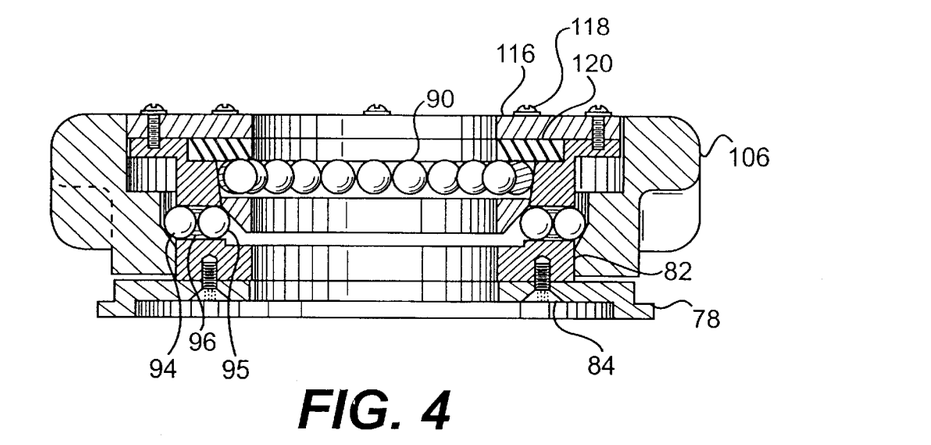
FIG. 4 is a sectional view of a one-way lock for a shaft in accordance with an embodiment of the present invention.

Each jaw end section 40 defines a slot 48 extending generally radially into the end section. Referring also to FIG. 3, end sections 40 extend through slots 42 so that jaw slots 48 are rearward of and parallel to a rear face 43 of nut 16. In the illustrated embodiment, each jaw slot 48 receives a garter spring 52 that applies a radially inward force to jaw end sections 40.

In addition, the nut may be formed with T-shaped slots or generally radially inward directed cylindrical bores instead of slots 42. In such embodiments, each of three equiangularly spaced apart T-shaped slots or cylindrical bores extend generally radially into the nut and may extend entirely through the nut. Jaw end sections 40 are formed in a corresponding T-shape or semi-circular shape so that the nut slots or nut bores slidably receive the respective jaw ends. These arrangements allow the jaw ends to move radially as the nut moves the jaws between open and closed positions. A dry lubricant coating may be provided on the jaw ends and/or nut slots to facilitate this movement. The cooperation between the jaw ends and the nut slots maintains the jaws at the proper angle with respect to the nut so that the jaws are maintained in alignment with the jaw passageways in the assembled chuck. As should be understood by one skilled in the art, the angle between the chuck axis and the direction of the nut slots or bores may vary to accommodate the particular type of jaw end configuration.

In a still further embodiment, a steel back ring includes inward biased elongated spring arms that extend inward from and generally circumferentially within the ring. The spring arm ends define slots that engage jaw slots 48 and maintain the jaws in proper alignment in the jaw passageways. When received in slots 48, the spring arms restrain rotation of the back ring about the chuck axis 31 and axially fix the back ring with respect to the jaws adjacent nut rear face 43.

As shown in FIG. 1, a nose piece 36 is press fit to nose section 20 of chuck body 14. Nose piece 36 defines a radially inward extending annular lip portion 38 at its axially forward end. Annular lip section 38 at least partially covers the front transverse face of body nose section 20. Nose piece 36 further defines a generally frustoconical section 34 at its axially rearward end. A radially inward facing surface 35 of frustoconical section 34 guides jaws 18 within passageways 30 and allows passage of jaws 18 rearward of the body passageways. It should be appreciated that nose piece 36 could be secured to the body by a snap fit, threading or the like.

Sleeve 12 is generally cylindrical and is disposed about body 14. Sleeve 12 includes an axially forward or nose section 66 and an axially rearward or tail section 68. As shown in FIG. 1, sleeve 12 forms the chuck's outer circumferential surface. Although the outer surface shown in the Figures is generally smooth, it should be understood that the outer surface may be knurled or may be provided with longitudinal ribs or other protrusions or depressions to enable the operator to grip it securely. Sleeve 12 may be fabricated from a structural plastic such as polycarbonate, a filled polypropylene, for example glass-filled polypropylene, or a blend of structural plastic materials. Other composite materials such as graphite filled polymerics could also be suitable in certain environments. Further, sleeve 12 may be constructed from other suitable materials, such as steel or a combination of materials. As should be appreciated by one skilled in the art, the materials from which the chuck of the present invention is fabricated may depend upon the end use of the chuck, and the above are provided by way of example only.

In the illustrated embodiment, sleeve 12 includes an insert 54 press fit to a radially inward facing surface 58 of the sleeve. Sleeve thread 50 and surface 55, referenced above, are defined on a radially inward surface of insert 54. In a preferred embodiment, insert 54 is metallic and includes a radially inward extending annular collar 56 at its axially rearward end. Sleeve surface 58 includes a groove 70 in tail section 68 that is configured to receive a retaining element, for example a snap ring 72.

A compression spring 101 disposed between nut 16 and insert 54 biases sleeve 12 toward a position that permits a greater amount of relative rotation between sleeve 12 and nut 16 in a tightening direction, as will be further described below. As illustrated in FIG. 3, a first end 101a of spring 101 abuts a pin 99 driven through a first bore 126 in sleeve 12 and a second bore 128 in insert 54, and a second end 101b abuts a flat surface or stop 103 defined on nut thread 44. Although a compression spring is illustrated to bias the nut with respect to the sleeve, it should be understood that any suitable biasing mechanism could be employed for this purpose.

Rotation of sleeve 12 clockwise, when viewed from nose section 20, moves nut 16 axially forward with respect to chuck axis 31, thereby moving jaws 18 to a closed position. Conversely, counter-clockwise rotation of the front sleeve moves the jaws in an opening direction. A stop 105 is provided at the rear edge of nut thread 44, as shown in FIG. 3. Sleeve insert 54 defines a stop (not illustrated) that engages nut stop 105 to prevent nut thread 44 from binding with jaw thread 50 in the open position. As discussed above, thread 44 defines a similar stop 103 at its forward end that engages spring 101 to bias nut 16 toward an open position with respect to sleeve 12.

As shown in FIG. 3, nut thread 44 defines approximately one turn around surface 46 of nut 16. A gap between nut thread edges 103 and 105 has an angular width greater than the width of the stop on insert 54. This facilitates the chuck's assembly in that the nut may be placed directly down into thread 50 over the sleeve stop.

Figure 2:
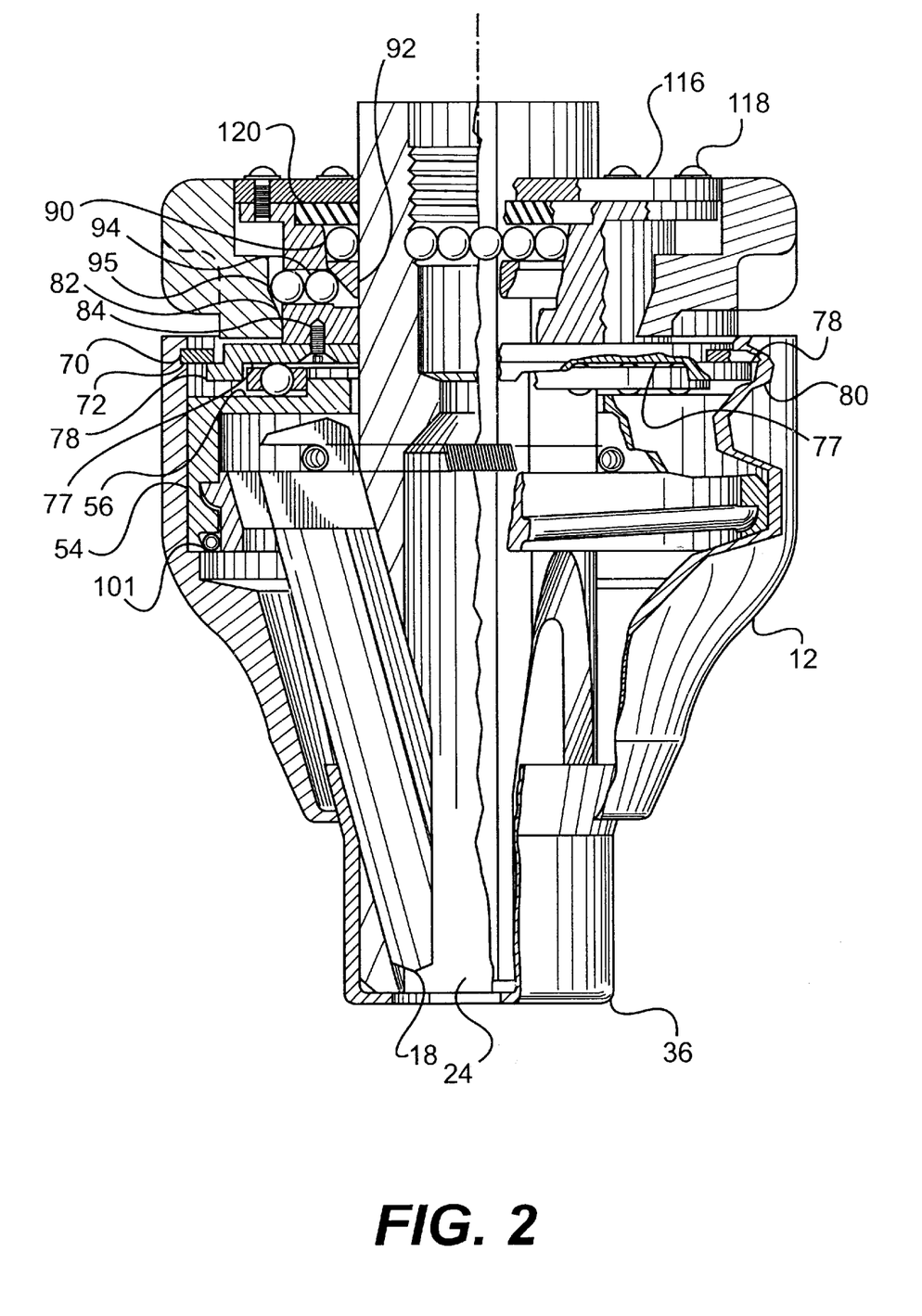
FIG. 2 is a plan view of the chuck of FIG. 1, showing the chuck in an open position.

As shown in FIG. 2, a caged ball bearing assembly 80 is operably disposed between an axially forward facing surface 77 of a flange 78 and an axially rearward facing surface 56 on insert 54. Flange 78 is axially fixed to an annular collar 82 by screws 84.

Figure 5:
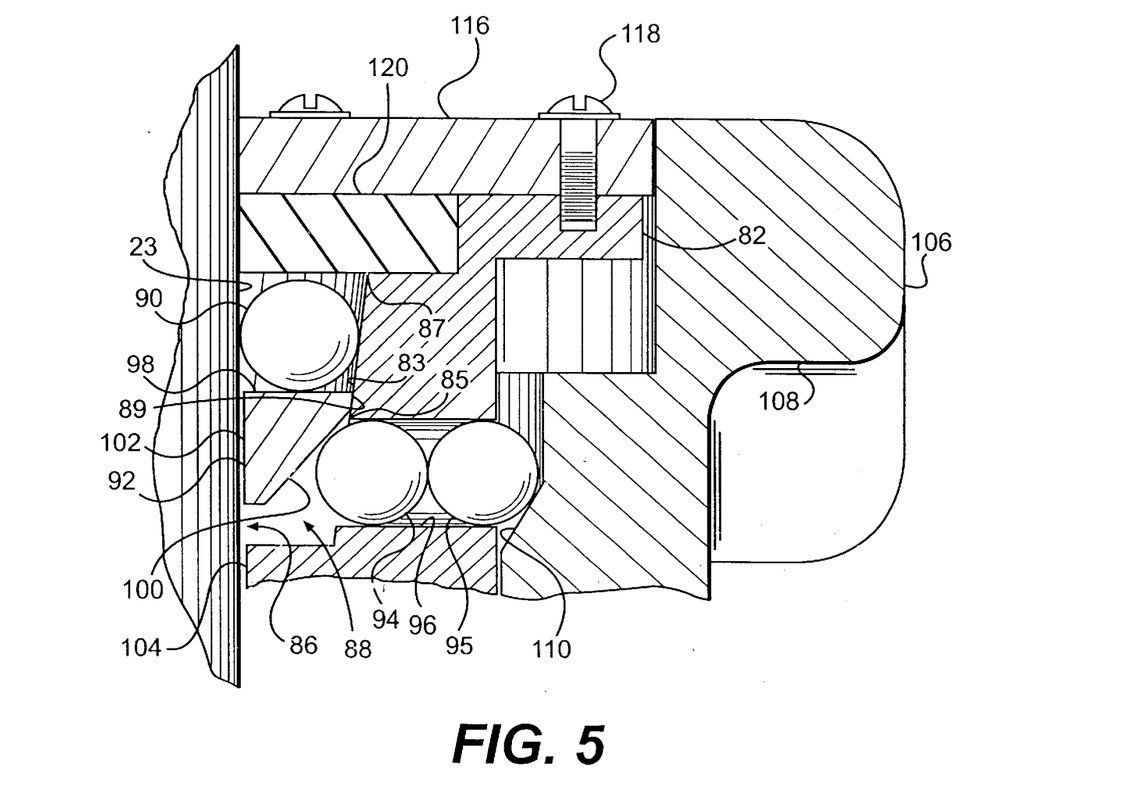
FIG. 5 is a partial cross-sectional view of the one-way lock for a shaft illustrated in FIG. 4.
Figure 6:
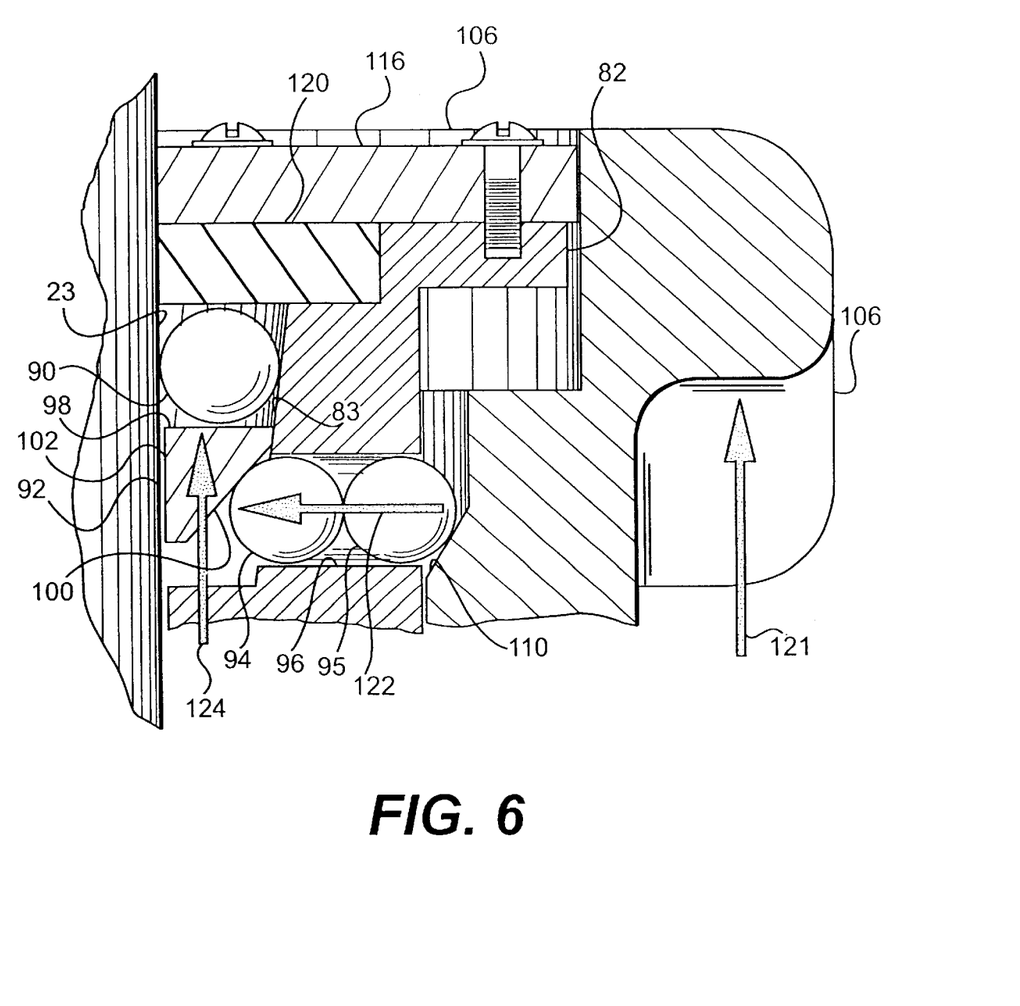
FIG. 6 is a partial cross-sectional view of the one-way lock for a shaft as in FIG. 5 showing the trigger in a release position.

Annular collar 82 defines an inner aperture 86 that receives the rear end of the chuck body. It should be understood, however, that the collar may be configured to receive a variety of shafts having various cross-sectional shapes. For example, where the chuck has a short body, the collar may be disposed about the drill spindle 23, as shown in FIGS. 5 and 6. Moreover, it should also be understood that collar 82 and its one-way lock described below may be used with devices other than drill chucks. Thus, references herein to shafts 22 and 23 are intended for purposes of illustration only and are not intended to limit the scope of the present invention.

Referring to FIGS. 3–6, an annular groove 88 extends radially outward from collar aperture 86. At least one rolling element, for example rolling balls 90, and a release member 92 are received within groove 88. As shown in FIG. 3, collar 82 also includes four radially inward directed bores 96 defined through collar 82. Each bore 96 receives a respective detent, for example rolling detent balls 94 and 95.

Release member 92 includes an axially rearward facing surface 98 in operative engagement with balls 90, and a generally frustoconical radially outward facing surface 100, opposite surface 98. Release member 92 further includes a radially inward facing surface 102 that is correspondingly shaped to the shaft 22/23. Surface 102 defines a circumference generally equal to the circumference of a radially inward facing surface 104 on collar 82.

Collar groove 88 defines a generally frustoconical radially inward facing surface 83 defined from a first end 85 to a second end 87. Surface 83 is tapered so that a first radial distance between first end 85 and shaft 22/23 is less than a second radial distance between second end 87 and the shaft. The diameter of each rolling element 90 is greater than the first distance and is less than the second distance. First end 85 is also radially inward of a radially outward facing outer circumference 89 of release member 92. Thus, first end 85 prevents movement of release member 92 in the axially forward direction with respect to collar 82 and maintains release number 92 adjacent to rolling elements 90.

A generally annular shaped trigger 106, shown in FIG. 5 in a first operative position, is co-axial with and axially reciprocal with respect to collar 82. Trigger 106 defines a generally frustoconical radially inward facing surface 110 so that axial movement of trigger 106 with respect to collar 82 is limited by detent balls 95 and 94 and flange 78 (FIG. 2). Trigger 106 includes a series of radially inward directed gripping depressions 108 about the forward axial end of its outer circumference.

A washer 116 is axially rearward of and axially fixed to collar 82 by screws 118. A spring, for example a washer shaped soft elastomeric washer 120, is axially forward of retention member 116 and biases balls 90 axially forward within collar groove 88 toward release member surface 98.

In operation, when the chuck is in an open position as shown in FIG. 2, an operator advances the jaws 18 within axial bore 24 into a gripping relationship with a tool by moving sleeve 12 or trigger 106 axially forward. Once the jaws grip the tool, rotation of sleeve 12 with respect to body 14 in the tightening direction pushes nut 16 axially forward due to interaction between nut threads 44 and sleeve threads 50 (FIG. 1). This in turn, further tightens jaws 18 onto the tool.

When the jaws close on a tool shaft, an axially rearward force from jaws 18 is transmitted to collar 82 through nut 16, insert 54, bearing assembly 80, and flange 78. As the collar is urged rearward, balls 90 begin to roll between shaft 22/23 and surface 83 on collar 82 toward first end 85 so that the balls wedge between the collar and the shaft. This prevents collar 82, and therefore nut 16 and jaws 18, from rearward movement and thus holds the jaws in their tightened grip on the tool.

To release the collar and the jaws, and referring now to FIG. 6, the operator pulls trigger 106 rearward so that surface 110 pushes detent balls 94 and 95 inward against surface 100, as indicated by arrow 122. This pushes the release member against rolling elements 90, as indicated by arrow 124, thereby relieving the wedge between collar surface 83, rolling elements 90, and shaft 22/23. As the operator continues to pull the trigger rearward, the detent maintains rolling elements 90 rearward in the groove formed between shaft 22/23 and tapered surface 83, thus permitting the collar to move rearwardly on the shaft. Collar 82, through flange 78 and snap ring 72, pulls sleeve 12, and therefore the nut and jaws, rearward to release the tool.

An operator may rotate sleeve 12 in a loosening direction prior to moving trigger 106 to the second operative position to provide an initial release of the wedging force between collar surface 83, rolling elements 90, and shaft 22/23. This facilitates actuation of the trigger, detent, and release member combination described above to unwedge the rolling elements.

Upon release of the axially rearward directed force 121 to trigger 106, spring 120 again exerts a force in the axially forward direction upon rolling elements 90, causing release member 92 to move slightly forward and allowing detent balls 94 and 95 to move radially outward. Thus, the trigger can return to its first operative position, and collar 82 and nut 16 can again slide freely in the axially forward direction to initially tighten jaws 18 onto a tool. The rolling elements still, however, prevent movement in the axially rearward direction absent actuation of trigger 106 to its second operative position as set forth above.

While one or more preferred embodiments of the invention have been described above, it should be understood that any and all equivalent realizations of the present invention are included within the scope and spirit thereof. The embodiments depicted are presented by way of example only and are not intended as limitations upon the present invention. For example, the collar might be axially forward of the nut or the drive shaft and chuck body exterior could be polygonal. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A chuck for use with a manual or powered driver having a drive shaft, said chuck comprising:

a generally elongated body having a nose section and a tail section, said tail section being configured to rotate with the drive shaft and said nose section having an axial bore formed therein;

a plurality of jaws movably disposed with respect to said body to and away from said axial bore;

a collar in axially driving engagement with said jaws and axially movably disposed with respect to said body so that movement of said collar in a first axial direction drives said jaws toward the axis of said bore and movement of said collar in a second axial direction opposite said first axial direction moves said jaws away from said axis, wherein said collar is configured to receive at least one of said body and a shaft and defines a first surface that faces a second surface defined by said at least one of said body and said shaft when said at least one of said body and said shaft is received by said collar, and wherein said first surface is tapered in the axial direction with respect to said axis from a first end of said first surface to a second end of said first surface so that a first radial distance between said second surface and said first end is less than a second radial distance between said second surface and said second end; and at least one rolling element disposed between said tapered surface and said second surface when said at least one of said body and said shaft is received by said collar and defining a diameter greater than said first radial distance and less than said second radial distance so that, when said rolling element engages said at least one of said body and said shaft, said collar is moveable in said first axial direction and so that axial force applied to said collar in said second axial direction wedges said at least one rolling element between said tapered first surface and said second surface.

2. The chuck as in claim 1, wherein said body is generally cylindrical, and said chuck includes a generally cylindrical sleeve operatively disposed about said body between said jaws and said collar.

3. The chuck as in claim 2, wherein said sleeve is disposed in communication with said jaws so that rotation of said sleeve with respect to said body in a first rotational direction moves said jaws toward said axis and rotation of said sleeve with respect to said body in a second rotational direction opposite said first rotational direction moves said jaws away from said axis.

4. The chuck as in claim 2, wherein movement of said sleeve in said first axial direction moves said jaws toward said axis and movement of said sleeve in said second axial direction moves said jaws away from said axis.

5. The chuck as in claim 2, wherein said sleeve defines an external surface of said chuck.

6. The chuck as in claim 1, wherein said first axial direction is defined from said body tail section toward said body nose section.

7. The chuck as in claim 2, including a nut axially movably disposed about said body and rotatable with respect to said sleeve, wherein said nut is in driving engagement with said jaws so that axial movement of said nut with respect to said body in said first axial direction moves said jaws toward said axis and axial movement of said nut with respect to said body in said second axial direction moves said jaws away from said axis.

8. The chuck as in claim 7, wherein said nut defines a thread on an outer circumference of said nut and wherein said sleeve defines a thread on an inner circumferential surface of said sleeve in engagement with said nut thread so that rotation of said sleeve in a first rotational direction with respect to said body moves said nut in said first axial direction.

9. The chuck as in claim 8, wherein said sleeve is constructed from a polymer material and includes an insert on which said sleeve thread is defined.

10. The chuck as in claim 9, wherein said insert is of a metallic material and is received by said sleeve in a press-fit.

11. The chuck as in claim 7, wherein said nut is non-rotatable with respect to said body.

12. The chuck as in claim 9, including a bearing disposed between said sleeve and said collar.

13. The chuck as in claim 12, wherein said insert defines a radially inward projecting flange having an axially rearward facing surface, and wherein said bearing is operatively disposed between said insert rearward facing surface and said collar.

14. The chuck as in claim 8, wherein said nut thread and said sleeve thread define a pitch of eight.

15. The chuck as in claim 1, including a release member axially movably disposed with respect to said first surface axially forward of and in operative engagement with said at least one rolling element.

16. The chuck as in claim 15, wherein said release member is an annular collar.

17. The chuck as in claim 15, wherein
said release member defines a tapered surface on a side of said release member opposite said rolling element,
said chuck includes a detent engaging said release member tapered surface, and
said chuck includes a trigger axially slidable with respect to said collar between a first position and a second position, wherein said trigger defines a cam surface and is disposed with respect to said detent so that in said second position said cam surface drives said detent against said release member tapered surface so that said release member drives said at least one rolling element toward said second end of said collar tapered surface.

18. The chuck as in claim 17, wherein said collar is generally annular and defines an inner aperture and wherein said collar defines an annular groove that defines said first surface and that receives said at least one rolling element and said release member.

19. The chuck as in claim 18, wherein said groove is radially outward of said aperture.

20. The chuck as in claim 19, including a spring operatively between said collar and said at least one rolling element biasing said at least one rolling element toward said first end.

21. The chuck as in claim 20, wherein said spring is an elastomeric washer.

22. The chuck as in claim 18, wherein said collar includes at least one radial cavity defined through said collar for receipt of said detent.

23. The chuck as in claim 22, wherein said detent includes at least one ball.

24. The chuck as in claim 1, including a plurality of said rolling elements.

25. A chuck for use with a manual or powered driver having a drive shaft, said chuck comprising:
a generally cylindrical body having a nose section and a tail section, said tail section being configured to rotate with the drive shaft and said nose section having an axial bore formed therein;
a plurality of jaws movably disposed with respect to said body to and away from said axial bore;

a generally cylindrical sleeve disposed about said body in driving communication with said jaws so that rotation of said sleeve with respect to said body in a first rotational direction moves said jaws toward the axis of said bore and so that rotation of said sleeve with respect to said body in a second rotational direction opposite said first rotational direction moves said jaws away from said axis, and so that axial movement of said sleeve in a first axial direction with respect to said body moves said jaws toward said axis and axial movement of said sleeve in a second axial direction opposite said first axial direction moves said jaws away from said axis;

a collar in axially driving engagement with said sleeve and axially movably disposed with respect to said body, said collar being configured to receive at least one of said body and a shaft and defining a first surface that faces and is radially offset from a second surface defined by said at least one of said body and said shaft when said at least one of said body and said shaft is received by said collar, wherein said first surface is tapered in the axial direction with respect to said axis from a first end of said first surface to a second end of said first surface so that a first radial distance between said second surface and said first end is less than a second radial distance between said second surface and said second end; and at least one rolling element disposed between said tapered first surface and said second surface when said at least one of said body and said shaft is received by said collar and defining a diameter greater than said first radial distance and less than said second radial distance so that, when said rolling element engages said at least one of said body and said shaft, said collar is moveable in said first axial direction and so that axial force applied to said collar in said second axial direction wedges said at least one rolling element between said tapered first surface and said second surface.

26. The chuck as in claim 25, wherein said chuck includes a nut axially movably disposed about said body and rotatable with respect to said sleeve, wherein said nut is in driving engagement with said jaws so that axial movement of said nut in said first axial direction moves said jaws toward said axis and axial movement of said nut in said second axial direction moves said jaws away from said axis.

27. The chuck as in claim 26, wherein said nut defines a thread on an outer circumference of said nut and wherein said sleeve defines a thread on an inner circumferential surface of said sleeve in engagement with said nut thread so that rotation of said sleeve in a first rotational direction with respect to said body moves said nut in said first axial direction.

28. The chuck as in claim 27, wherein said sleeve is constructed from a polymer material and includes an insert on which said sleeve thread is defined.

29. The chuck as in claim 28, wherein said insert is of a metallic material and is received by said sleeve in a press-fit.

30. The chuck as in claim 27, wherein said engagement of said nut thread and said sleeve thread is configured so that, when said collar axially drives said jaws to a closed position, rotation of said sleeve with respect to said nut in said first rotational direction applies a further closing force to said jaws.

31. The chuck as in claim 28, including a bearing disposed between said sleeve and said collar.

32. The chuck as in claim 31, wherein said insert defines a radially inward projecting flange having an axially rearward facing surface, and wherein said bearing is operatively disposed between said insert rearward facing surface and said collar.

33. The chuck as in claim 25, including a release member axially movably disposed with respect to said first surface axially forward of and in operative engagement with said at least one rolling element.

34. The chuck as in claim 33, wherein said release member is an annular collar.

35. The chuck as in claim 34, wherein said release member defines a tapered surface on a side of said release member opposite said rolling element, said chuck includes a detent engaging said release member tapered surface, and said chuck includes a trigger axially slidable with respect to said collar between a first position and a second position, wherein said trigger defines a cam surface and is disposed with respect to said detent so that in said second position said cam surface drives said detent against said release member tapered surface so that said release member drives said at least one rolling element toward said second end of said collar tapered surface.

36. The chuck as in claim 33, wherein said collar is generally annular and defines an inner aperture, and wherein said collar defines an annular groove that defines said first surface and that receives said at least one rolling element and said release member.

37. The chuck as in claim 36, wherein said groove is radially outward of said aperture.

38. The chuck as in claim 37, including a spring operatively between said collar and said at least one rolling element biasing said at least one rolling element toward said first end.

39. The chuck as in claim 35, wherein said collar includes at least one radial cavity defined through said collar for receipt of said detent.

40. The chuck as in claim 39, wherein said detent includes at least one ball.

41. A chuck for use with a manual or powered driver having a drive shaft, said chuck comprising:

a generally cylindrical body having a nose section and a tail section, said tail section being configured to rotate with the drive shaft and said nose section having an axial bore formed therein;

a plurality of jaws movably disposed with respect to said body to and away from said axial bore;

a generally cylindrical sleeve disposed about said body in driving communication with said jaws so that rotation of said sleeve with respect to said body in a first rotational direction moves said jaws toward the axis of said bore and so that rotation of said sleeve with respect to said body in a second rotational direction opposite said first rotational direction moves said jaws away from said axis, and so that axial movement of said sleeve in a first axial direction with respect to said body moves said jaws toward said axis and axial movement of said sleeve in a second axial direction opposite said first axial direction moves said jaws away from said axis, said sleeve including an insert, said insert including a radially inward facing first surface defining a thread thereon, said sleeve including a groove defined on a second radially inward facing surface of said sleeve;

a nut axially movably disposed about said body and rotatable with respect to said sleeve, wherein said nut is in driving engagement with said jaws so that axial movement of said nut in said first axial direction moves said jaws toward said axis and axial movement of said nut in said second axial direction moves said jaws away from said axis, said nut defining a thread on an outer circumference of said nut in engagement with said sleeve thread so that rotation of said sleeve in a first rotational direction with respect to said body moves said nut in said first axial direction with respect to said body;

a retaining element received in said sleeve groove, said retaining element defining an axially forward facing surface;

a generally washer shaped flange member axially movably disposed about said body, said flange member defining an axially rearward facing surface about its outer circumference in engagement with said retaining element forward facing surface to hold said flange member against rearward axial movement with respect to said sleeve;

a bearing disposed between said sleeve insert and said flange member;

a collar fixed to said flange member in axially driving engagement with said sleeve and axially movably disposed with respect to said body, wherein said collar is configured to receive at least one of said body and a shaft and defines a first surface that faces a second surface defined by said at least one of said body and said shaft when said at least one of said body and said shaft is received by said collar, and wherein said first surface is radially offset from said axis of said body and is tapered in the axial direction with respect to said axis from a first end of said first surface to a second end of said first surface so that a first radial distance between said second surface and said first end is less than a second radial distance between said second surface and said second end, said collar including an annular groove defined radially outward of said second surface and a plurality of radial cavities defined through said collar;

a plurality of rolling elements received in said collar groove between said collar tapered first surface and said second surface when said at least one of said body and said shaft is received by said collar and defining a diameter greater than said first radial distance and less than said second radial distance so that, when said rolling elements engage said at least one of said body and said shaft, said collar is moveable in said first axial direction and so that axial force applied to said collar in said second axial direction wedges said rolling elements between said tapered first surface and said second surface;

an annular release member received in said collar groove in operative engagement with said rolling elements, said release member defining a tapered surface on a side of said release member opposite said rolling elements;

a plurality of detent mechanisms received in said collar radial cavities engaging said release member tapered surface;

a trigger axially slidable with respect to said collar between a first position and a second position, wherein said trigger defines a radially inward facing cam surface and is disposed with respect to said detents so that in said second position said cam surface drives said detents against said release member tapered surface so that said release member drives said rolling elements toward said second end of said collar tapered first surface;

a retaining washer fixed to said collar axially rearward of said rolling elements; and a spring disposed operatively between said retaining washer and said rolling elements biasing said rolling elements toward said first end.

42. A one-way lock for a shaft, said lock comprising:

a collar configured to receive a shaft, said collar defining a first surface that faces a second surface defined by said shaft when said shaft is received by said collar, and wherein said first surface is tapered in the axial direction with respect to an axis of said shaft from a first end of said first surface to a second end of said first surface so that a first radial distance between said second surface and said first end is less than a second radial distance between said second surface and said second end; and at least one rolling element disposed between said tapered first surface and said second surface when said shaft is received by said collar and defining a diameter greater than said first radial distance and less than said second radial distance so that, when said collar receives said shaft, said collar is moveable on said shaft in a first axial direction defined from said second end toward said first end and so that axial force applied to said collar in a second axial direction opposite said first axial direction wedges said at least one rolling element between said first tapered surface and said second surface.

43. The one-way lock as in claim 42, including a release member axially movably disposed with respect to said first surface axially forward of and in operative engagement with said at least one rolling element.

44. The one-way lock as in claim 43, wherein said release member is an annular collar.

45. The one-way lock as in claim 43, wherein said release member defines a tapered surface on a side of said release member opposite said rolling element, said one-way lock includes a detent engaging said release member tapered surface, and said one-way lock includes a trigger axially slidable with respect to said collar between a first position and a second position, wherein said trigger defines a cam surface and is disposed with respect to said detent so that in said second position said cam surface drives said detent against said release member tapered surface so that said release member drives said at least one rolling element toward said second end of said collar tapered first surface.

46. The one-way lock as in claim 43, wherein said collar is generally annular and defines an inner aperture, and wherein said collar defines an annular groove that that defines said tapered first surface and that receives said at least one rolling element and said release member.

47. The one-way lock as in claim 42, including a spring operatively between said collar and said at least one rolling element biasing said at least one rolling element toward said first end.

48. The one-way lock as in claim 47, wherein said spring is an elastomeric washer.

49. The one-way lock as in claim 45, wherein said collar includes at least one radial cavity defined through said collar for receipt of said detent.

50. The one-way lock as in claim 49, wherein said detent includes at least one ball.

51. The one-way lock as in claim 42, including a plurality of said rolling elements.

* * * * *